(No Model.)
W. H. SPARKS.
BICYCLE.
No. 600,046. Patented Mar. 1, 1898.
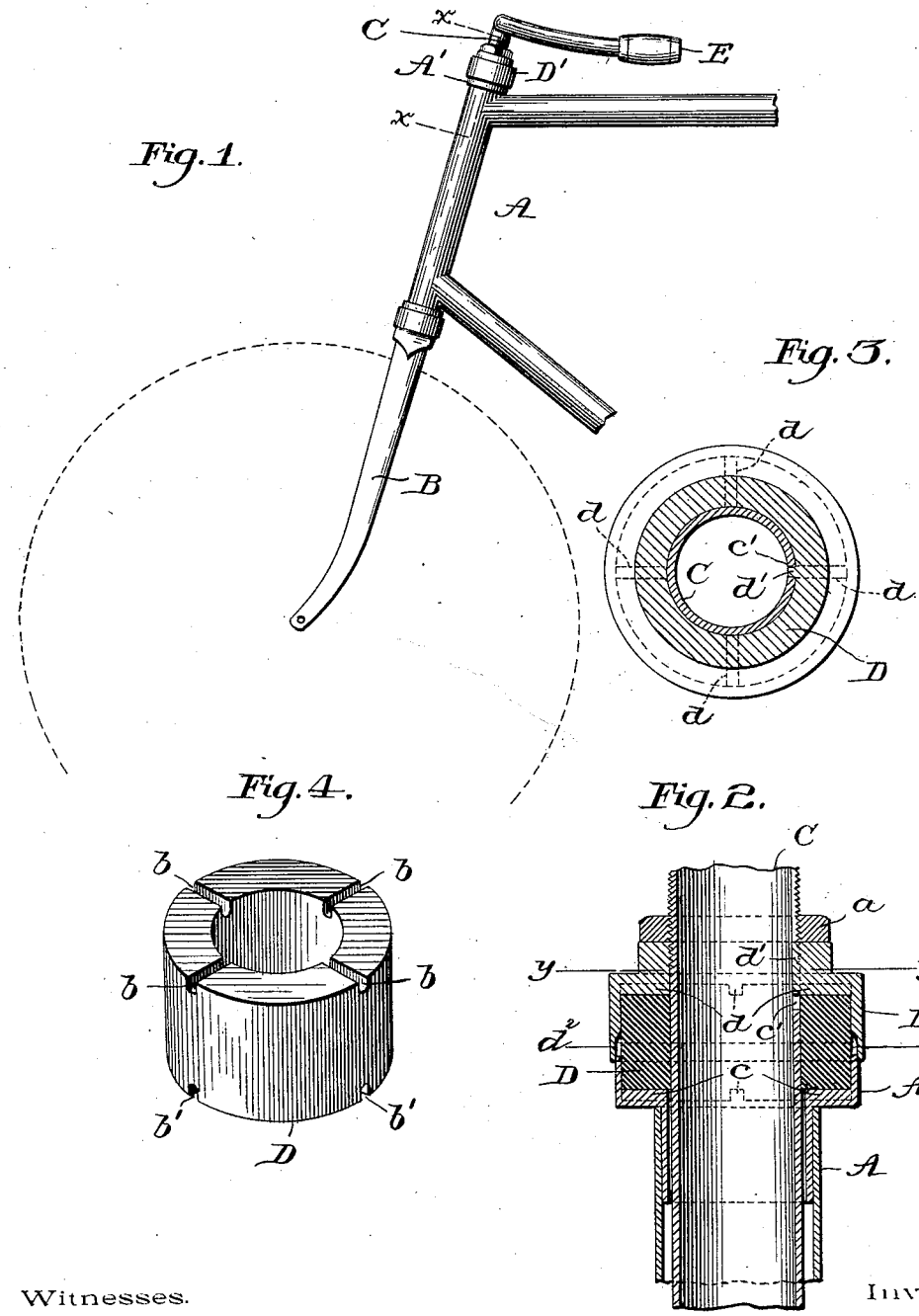
Witnesses.
Sam H. Kirkpatrick
Wm Love
Inventor.
William H. Sparks
by Thomas J. Moulds
Attorney.

UNITED STATES PATENT OFFICE.

WILLIAM H. SPARKS, OF CAMDEN, NEW JERSEY, ASSIGNOR OF ONE-HALF TO JOSEPHUS ROBERTS, OF PHILADELPHIA, PENNSYLVANIA.

BICYCLE.

SPECIFICATION forming part of Letters Patent No. 600,046, dated March 1, 1898.

Application filed July 28, 1897. Serial No. 646,179. (No model.)

*To all whom it may concern:*

Be it known that I, WILLIAM H. SPARKS, a citizen of the United States, residing at Camden, in the county of Camden and State of New Jersey, have invented certain new and useful Improvements in Bicycles, of which the following is a specification, reference being had therein to the accompanying drawings.

My invention relates to bicycles; and the objects of my improvement are to avoid the use of ball-bearings in the head of the cycle and to provide means for keeping the front fork in line and yet allow it to be turned easily and quickly by a slight pressure on the handle-bars.

To accomplish the desired result, I place in the head of the frame, at the points usually occupied by the ball-bearings, soft-rubber collars that fit into cups secured rigidly to the head of the frame of the bicycle, each of said cups having a suitable cover that is secured to the front-fork stem, and the rubber collars provided top and bottom with notches or depressions that fit over corresponding lugs formed in the cups and on the covers therefor, being by this means prevented from turning bodily and given a torsional movement or twist by every movement of the handle-bar or turn of the front fork.

In the accompanying drawings, Figure 1 is a view in perspective of the front portion of the frame of a bicycle having my improved rubber bearings fitted therein. Fig. 2 is a sectional view through the head of the bicycle on line $x\ x$ of Fig. 1. Fig. 3 is a horizontal sectional view on line $y\ y$ of Fig. 2. Fig. 4 is a view of one of the rubber collars removed from the head of the bicycle.

A represents the usual tubular head of the bicycle-frame; B, of the front fork.

C is the fork-stem, extending through the head.

$c'$ is a vertical slot cut in the upper end of the fork-stem.

$A'$ is a cup secured rigidly to the head of the frame A.

D is a soft-rubber collar fitting into the cup $A'$.

$D'$ is a cap or cover fitting over the rubber collar D and held in place by the jam-nut $a$, screwing around the front-fork stem.

$b\ b\ b\ b$ are four notches or depressions formed in the top of the soft-rubber collar D. $b'\ b'\ b'\ b'$ are similar notches or depressions formed in the bottom of the collars D.

$c\ c\ c\ c$ are four projecting lugs formed on the bottom of the cup $A'$ and fitting into the notches $b'$ on the bottom of the collar D.

$d\ d\ d\ d$ are lugs formed on the under side of the cover $D'$ and fitting into the notches $b$ on the top of the collar D.

E is the usual form of handle-bar, having the stem thereof fitting into the fork-stem C.

The head of the bicycle being fitted with the soft-rubber collar D in the manner described, the slightest pressure on the handle-bars or any sidewise movement of the front wheel will produce a torsional movement or twist on the rubber collar, and the tension thus produced will have a tendency to bring the front wheel back into line with the rear wheel. The farther the handle-bars are turned the more the torsional spring of the rubber collar is increased, and should the front wheel be suddenly forced out of position by striking an obstruction in the road it will be quickly brought back into line, thus many times avoiding a serious accident.

While the torsional spring of the rubber collar will hold the front wheel in line with the rear wheel, it does not interfere with the free movement of the front wheel when the rider desires to turn, as a very slight pressure on the handle-bars will turn the wheel sufficient for any ordinary purpose.

For convenience in description I have shown the rubber collar only at the top of the fork extension, but it can also be placed directly above the fork-crown in the position usually occupied by the ordinary ball-bearings, or one rubber collar may be used in conjunction with one or the other of the ball-bearings left in the head of the cycle. If it is for any reason desired to increase the torsional tension of the rubber collar D, the jam-nut $a$ is screwed farther down on the stem C, when the surplus rubber will be forced out against the cut-away part $d^2$ of the cap $D'$.

Besides the torsional movement given to the fork-stem by the rubber collar D, I have found that it forms an almost perfect joint for the head of the cycle and overcomes much, if not all, of the vibration in the fork-stem. When used simply as a joint, the rubber collar need not be held rigidly in the head of the cycle, but may be allowed to turn slightly therein.

Under some conditions a metal spring or springs may be used in place of the rubber collar, but the best results are obtained when rubber is used, as the torsional tension is the same when the handle-bars are turned in either direction, while the tension of a spring is not the same in both directions, and it would probably require two springs wound in opposite directions to produce the desired effect.

Having thus described my invention, what I claim as new, and desire to secure by Letters Patent, is—

1. A bicycle-fork stem having in one of the bearings, a soft-rubber collar, one end of which is secured in the head of the bicycle-frame and the opposite end secured to the fork extension in such a way that a torsional movement or twist is given to the rubber collar when the front fork is turned in either direction, substantially as shown.

2. In a bicycle the combination of the tubular head A having thereon the cup A', fixedly secured to the head and provided with the projecting lug c, c; the fork extension C, having thereon the cover D', secured rigidly to the extension C, and having therein the projecting lugs d, d; with the soft-rubber collar D, provided with the depression or notches b and b', all arranged substantially as shown and for the purpose described.

3. A bicycle having in the tubular head thereof a rubber collar secured to the frame and to the stem of the fork, by means of which the front wheel when turned to either side will be automatically returned and held normally in line with the frame, as set forth.

In testimony whereof I affix my signature in presence of two witnesses.

WILLIAM H. SPARKS.

Witnesses:
THOS. D. MOWLDS,
SAML. H. KIRKPATRICK.